United States Patent
Podack

(10) Patent No.: US 8,063,530 B2
(45) Date of Patent: Nov. 22, 2011

(54) PERMANENT MAGNET ROTOR WITH PROJECTIONS FOR FIXING THE PERMANENT MAGNETS OF THE ROTOR PACKET

(75) Inventor: Marcus Podack, Wuerzburg (DE)

(73) Assignee: Brose Fahrzeugteile GmbH & Kommanditgesellschaft, Würzburg, Würzburg (DE)

( * ) Notice: Subject to any disclaimer, the term of this patent is extended or adjusted under 35 U.S.C. 154(b) by 62 days.

(21) Appl. No.: 12/516,417

(22) PCT Filed: Nov. 28, 2007

(86) PCT No.: PCT/EP2007/062962
§ 371 (c)(1),
(2), (4) Date: Jan. 11, 2010

(87) PCT Pub. No.: WO2008/065146
PCT Pub. Date: Jun. 5, 2008

(65) Prior Publication Data
US 2010/0141074 A1    Jun. 10, 2010

(30) Foreign Application Priority Data
Dec. 1, 2006  (DE) .......................... 10 2006 056 873

(51) Int. Cl.
*H02K 21/12*    (2006.01)
(52) U.S. Cl. ................................................. 310/156.08
(58) Field of Classification Search ............. 310/156.08, 310/156.12, 156.19, 156.31, 156.53, 156.56, 310/156.72
See application file for complete search history.

(56) References Cited

U.S. PATENT DOCUMENTS

| 4,486,679 | A | 12/1984 | Jones |
| 5,864,191 | A * | 1/1999 | Nagate et al. ............ 310/156.54 |
| 6,707,206 | B2 * | 3/2004 | Chang ...................... 310/156.08 |
| 7,605,510 | B2 * | 10/2009 | Okuma et al. .......... 310/156.53 |
| 7,683,518 | B2 * | 3/2010 | Yoshikawa et al. .... 310/216.055 |
| 2006/0119205 | A1 | 6/2006 | Sasaki |

FOREIGN PATENT DOCUMENTS

| DE | 4423840 A1 | 1/1996 |
| DE | 19851883 A2 | 5/2000 |
| DE | 102005041676 A1 | 3/2007 |
| EP | 1009085 A | 6/2006 |
| JP | 06-133479 | * 5/1994 |

OTHER PUBLICATIONS

International Search Report in PCT/EP2007/062962, dated Apr. 9, 2008.
German Office Action in priority Application No. 102006056873.7, Dated Jun. 28, 2007.

* cited by examiner

*Primary Examiner* — Nguyen N Hanh
(74) *Attorney, Agent, or Firm* — Manelli Selter PLLC; Edward J. Stemberger

(57) ABSTRACT

A permanent magnet rotor includes a rotor shaft, a rotor packet that is secured to the rotor shaft and that has a radially inner region and a radially outer region, reception pockets provided in the rotor packet between its radially inner region and its radially outer region and permanent magnets that are positioned in the reception pockets. Clearances are provided in the radially inner region of the rotor packet. The permanent magnets are fixed in the respectively associated reception pocket by means of a projection of a part region of the inner region, wherein the part region is arranged between the respective clearance and the respective reception pocket.

13 Claims, 3 Drawing Sheets

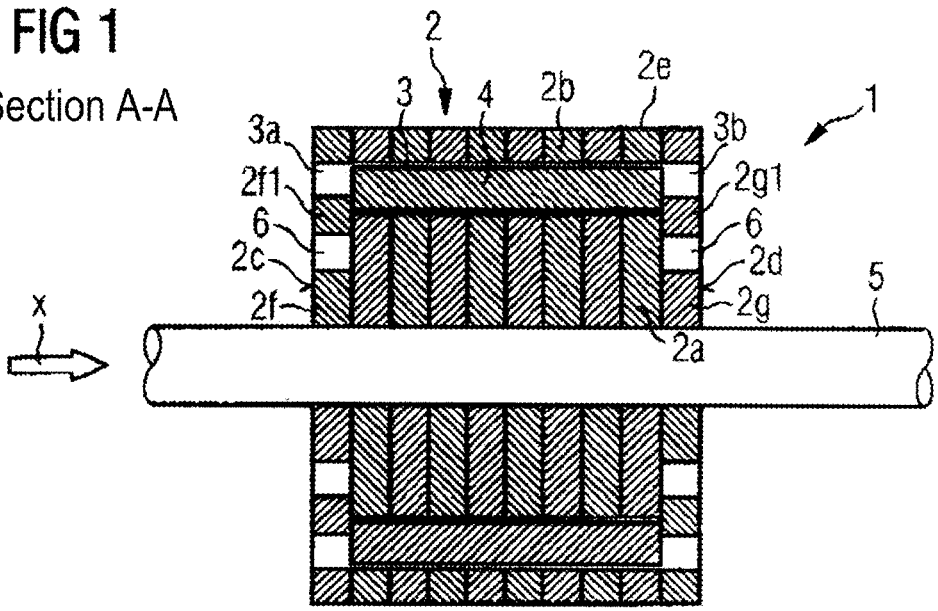
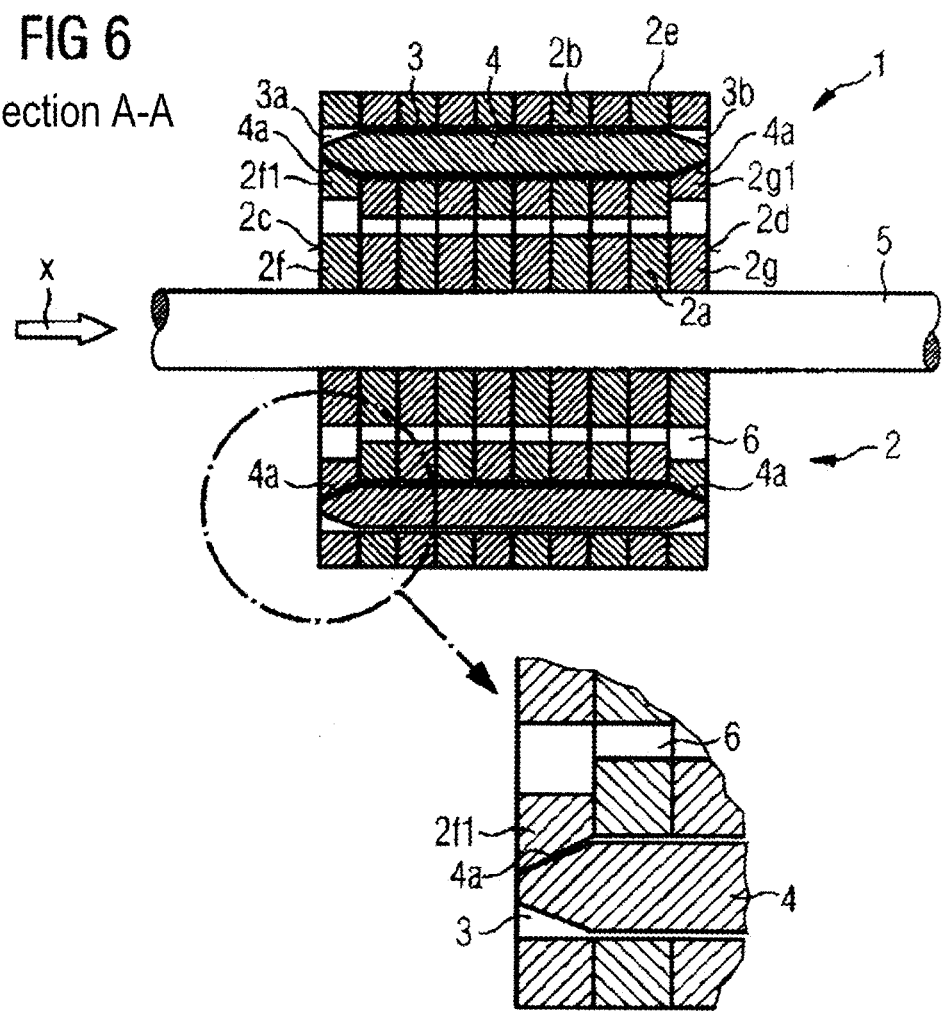

PERMANENT MAGNET ROTOR WITH PROJECTIONS FOR FIXING THE PERMANENT MAGNETS OF THE ROTOR PACKET

BACKGROUND OF THE INVENTION

The invention relates to a permanent magnet rotor which has a rotor shaft, a rotor packet fastened to the rotor shaft and having a radially inner region and a radially outer region, reception pockets provided in the rotor packet between its radially inner region and its radially outer region, and permanent magnets positioned in the reception pockets.

DE 198 51 883 A1 discloses a permanent-magnet-excited synchronous machine with a sheet-laminated rotor packet into which permanent magnets are embedded. At least one magnetic flux barrier is provided at least between a recess for receiving a permanent magnet consisting of at least one magnetic plate and the air gap of the synchronous machine. At the virtual meeting of two recesses which serve for receiving the permanent magnets, the recesses are shaped such that, in addition to fixing of the permanent magnets, stray webs are also obtained.

A permanent-magnet-excited rotor for an electric machine is known from U.S. Pat. No. 4,486,679 A. This known rotor has in its rotor sheet packet recesses into which permanent magnets are introduced. Webs running in the radial direction are provided between adjacent recesses. Thin bridges are located between the outer margins of the recesses and the outer circumference of the rotor sheet packet. The permanent magnets are fixed in the recesses by the bridges being pressed in and due to the resulting deformation of the webs extending in the radial direction.

Furthermore, it is already known for permanent magnets provided in recesses of a rotor packet to be adhesively bonded, sealed in or fastened, using clamps, within these recesses.

The object of the invention is to develop a permanent magnet rotor which has a rotor shaft, a rotor packet fastened to the rotor shaft, reception pockets provided in the rotor packet and permanent magnets positioned in the reception pockets, in such a way that the fastening of the permanent magnets in the reception pockets is improved.

SUMMARY OF THE INVENTION

This object is achieved by means of a permanent magnet rotor having a rotor shaft, a rotor packet fastened to the rotor shaft and including a radially inner region and a radially outer region, reception pockets provided in the rotor packet between its radially inner region and its radially outer region, permanent magnets positioned in the reception pockets, and clearances provided in the radially inner region of the rotor packet. The permanent magnets are fixed in the respectively associated reception pocket by means of a projection of a part region of the inner region, wherein the part region is arranged between the respective clearance and the respective reception pocket.

The advantages of a permanent magnet rotor according to the invention are that the fastening of the permanent magnets in the reception pockets of the rotor packet can be carried out in a very simple way. It is merely necessary, after the insertion of the permanent magnets into the reception pockets, by means of a tool to bend radially outward the part regions of the inner region which are located between the clearances in the radially inner region of the rotor packet and the reception pockets, so as to give rise in each case to a projection in the form of a closed tab or of two extensions, which partially closes the respective reception pocket and fixes the respective permanent magnet in the respective reception pocket.

Should an exchange of the permanent magnets be necessary at a later time, this can take place in a simple way in that, first, the projection is bent back into its original shape, and the respective permanent magnet is then removed from the reception pocket and replaced by a new permanent magnet.

Further advantages of the invention are that the additional components, such as adhesives, a sealing compound and/or clamps, required in known permanent magnet rotors for fixing the permanent magnets in the reception pockets, are not necessary. The functions of these additional components are assumed completely by the claimed projections of the part regions of the inner region of the rotor packet which lie between the respective clearance and the respective reception pocket.

A further advantage is that, in a permanent magnet rotor, the magnetic field occurring during operation is influenced at most insignificantly by the claimed projections. In particular, no impairments in the magnetic field formed between the rotor and the stator occur.

BRIEF DESCRIPTION OF THE DRAWINGS

Further advantageous properties of the invention may be gathered from the following exemplary explanation of it, with reference to the drawings in which:

FIG. 1 shows a longitudinal sectional illustration of a permanent magnet rotor according to the invention, FIG. 6 shows a longitudinal sectional illustration of a permanent magnet rotor according to an alternative embodiment of the invention.

DETAILED DESCRIPTION OF EXEMPLARY EMBODIMENTS

Figure 2:
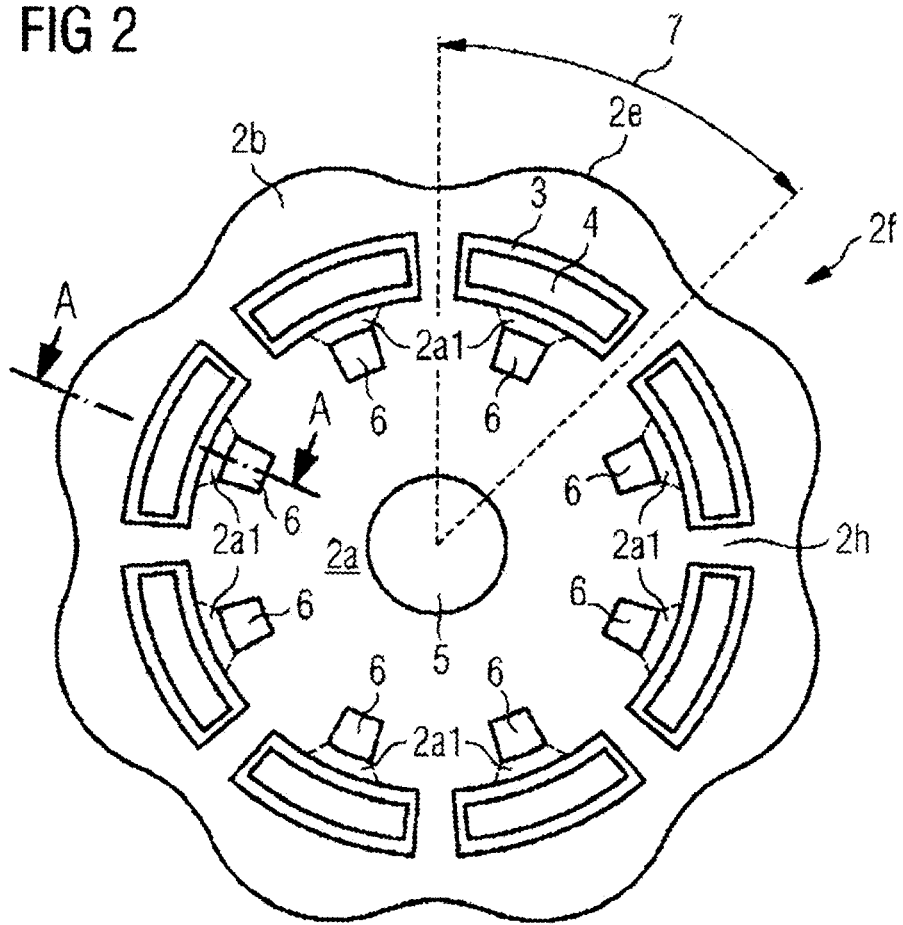
FIG. 2 shows a view of the permanent magnet rotor illustrated in FIG. 1 in the direction of the arrow x shown in FIG. 1 according to a first exemplary embodiment of the invention.

FIG. 1 shows a longitudinal sectional illustration of a permanent magnet rotor 1 according to the invention. This has a rotor shaft 5 to which a rotor packet 2 is fastened.

This rotor packet is a rotor sheet packet which is composed of a multiplicity of sheet lamellae or sheet laminations. The rotor packet illustrated has an inner region 2a, which lies between the rotor shaft 5 and reception pockets 3 of the rotor packet, and an outer region 2b, which lies between the reception pockets 3 and the outer circumference 2e of the rotor packet. Furthermore, the rotor packet 2 shown has end faces 2c and 2d.

Permanent magnets 4 are inserted into the reception pockets 3 of the rotor packet 2. The insertion of these permanent magnets 4 into the reception pockets 2 takes place, for example, in the direction of the arrow x shown in FIG. 1.

Projections 2f1 and 2g1 serve for fixing the permanent magnets 4 in the reception pockets 3 and are provided in the sheet lamella 2f located nearest to the end face 2c of the rotor packet and in the sheet lamella 2g located nearest to the end face 2d of the rotor packet, as is explained in more detail below with reference to FIGS. 2-5. By means of these projections, the two orifices 3a and 3b of the reception pockets 3 are in each case partially closed, so that the permanent magnets cannot be thrown out of the reception pockets during operation.

According to a further exemplary embodiment, not illustrated in the figures, the reception pockets have in each case only one orifice, for example on the end face 2c of the rotor packet. The respective other end region of the reception pockets is closed in this further exemplary embodiment. In this further exemplary embodiment, to fix the permanent magnets in the reception pockets, it is merely necessary to close, in each case by means of a projection, those orifices of the reception pockets which are provided on the end face 2c of the rotor packet.

As already stated above, the rotor packet 2 consists of a multiplicity of sheet lamellae. These sheet lamellae are preferably produced by means of a stamping operation. All the sheet lamellae have first clearances which are stamped-free portions. These first clearances, as a whole, form the reception pockets 3 of the rotor packet after the assembly of the rotor sheet packet.

Furthermore, according to a first embodiment of the invention, the sheet lamella located nearest to the first end face 2c of the sheet packet and the sheet lamella located nearest to the second end face 2d of the sheet packet contain in each case further clearances 6 which are likewise stamped-free portions. These further clearances 6 are the claimed clearances in the radially inner region of the rotor packet. The part regions of the inner region 2a which lie between these further clearances 6 and the reception pockets 3 are bent up after the insertion of the permanent magnets, in order in each case partially to close the reception pockets and fix the permanent magnets positively. In this first embodiment, all the further sheet lamellae which are positioned between the two end-face sheet lamellae have no further clearance. This first embodiment is illustrated in FIG. 1.

According to a second embodiment, in which the reception pockets are provided with orifices only on the first end face of the rotor packet, once again all the sheet lamellae have the first clearances which, as a whole, form the reception pockets for the permanent magnets. In this second embodiment, only the sheet lamella located nearest to the first end face has the further clearances provided in the radially inner region, so that, after the insertion of the permanent magnets into the reception pockets, a partial closing of the orifices of the reception pockets can be carried out by bending up the part regions of the inner region which lie between the respective further clearance and the respective reception pocket, so that the permanent magnets are fixed positively.

According to a third embodiment, all the sheet lamellae of the rotor packet have both the first clearances and the second clearances. In this third embodiment, for the partial closing of the reception pockets, only the part regions, lying between the clearances and the reception pocket, of the inner region of those sheet lamellae which lie nearest to the end face or end faces of the rotor packet are bent up. The advantage of this third embodiment is that all the sheet lamellae of the rotor packet can be produced in an identical way by means of one stamping operation.

According to an advantageous development of the invention, the part regions, lying between the clearances and the reception pockets, of the inner region of the sheet lamellae positioned in the axially middle region of the rotor packet are also additionally bent up, so that the permanent magnets are also fixed non-positively in the reception pockets.

FIG. 2 shows a view of the permanent magnet rotor illustrated in FIG. 1 in the direction of the arrow x shown in FIG. 1, according to a first exemplary embodiment of the invention. This view makes clear the shape of the sheet lamella 2f located nearest to the end face 2c of the rotor packet.

It is evident from this FIG. 2 that, in this exemplary embodiment, the outer circumference 2e of the lamella 2f does not run circularly, but has an essentially sinusoidally formed shape. The outer circumference of the further lamellae of the rotor packet has the same shape as the outer circumference of the lamella 2f.

Moreover, it may be gathered from FIG. 2 that the sheet lamella 2f has overall 8 first clearances 3 which, together with corresponding first clearances of the further lamellae, form the reception pockets for the permanent magnets 4. These reception pockets 3 are distributed equidistantly over the circumference of the sheet lamella. Webs 2h are provided in each case between adjacent reception pockets 3. The radially inner region 2a of the sheet lamella is located between the shaft 5 and the reception pockets 3. The radially outer region 2b of the sheet lamella is located between the reception pockets 3 and the outer circumference 2e.

Moreover, it may be gathered from FIG. 2 that, in the radially inner region 2a, further clearances 6 are provided which are stamped-free portions. The part regions 2a1, lying between these further clearances 6 and the reception pockets 3, of the radially inner region 2a are bent outward in a radial direction by means of a tool after the insertion of the permanent magnets 4 into the reception pockets 3, in order to fix the permanent magnets 4 positively in the reception pockets 3.

Figure 3:
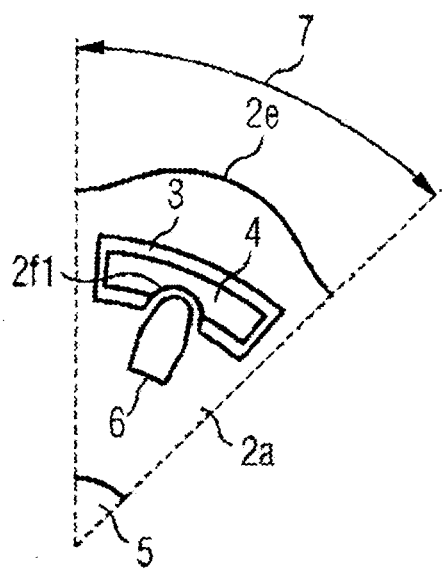
FIG. 3 shows a view of the sector 7 illustrated in FIG. 2 after the bending up of the part region, lying between the recess and the reception pocket, of the inner region of the rotor packet.

This bent-up state is made clear in FIG. 3 in which the sector 7, shown in FIG. 2, of the sheet lamella 2f is illustrated. It is evident from FIG. 3 that, by the part region 2a1 located between the clearance 6 and the reception pocket 3 of this sector being bent up, a projection in the form of a closed tab 2f1 is obtained which fixes the permanent magnet 4 in the reception pocket 3.

Figure 4:
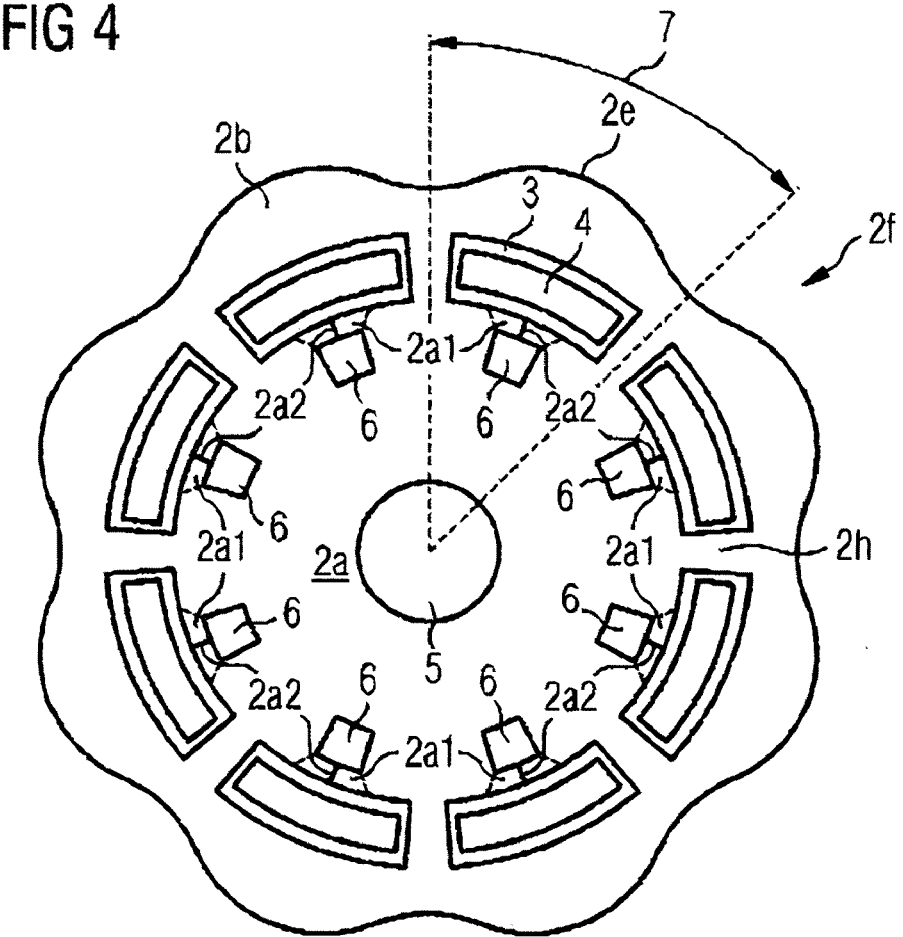
FIG. 4 shows a view of the permanent magnet rotor illustrated in FIG. 1 in the direction of the arrow x shown in FIG. 1 according to a second exemplary embodiment of the invention.

FIG. 4 shows a view of the permanent magnet rotor illustrated in FIG. 1 in the direction of the arrow x shown in FIG. 1, according to a second exemplary embodiment of the invention. This view, too, makes clear the shape of the sheet lamella 2f located nearest to the end face 2c of the rotor packet.

The sheet lamella 2f shown in FIG. 4 is largely identical to the sheet lamella 2f shown in FIG. 2. It differs from this, however, in that the part regions 2a1 of the inner region 2a which lie between the further clearances 6 and reception pockets 3 are in each case provided with a slot 2a2. These slots 2a2 make it easier to bend up the part regions 2a1 lying between the further clearances 6 and reception pockets 3.

Figure 5:
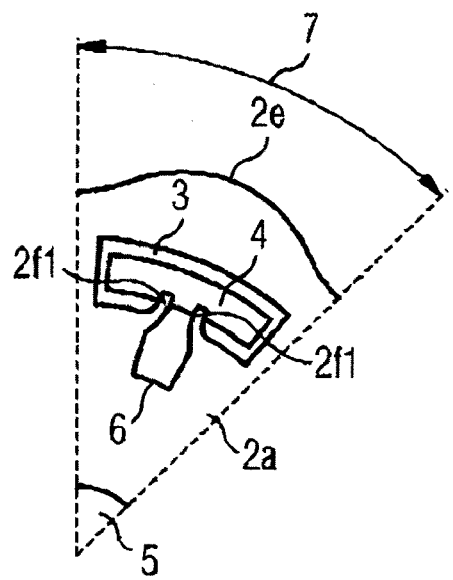
FIG. 5 shows a view of the sector 7 illustrated in FIG. 4 after the bending up of the part region, lying between the recess and the reception pocket, of the inner region of the rotor packet.

This bent-up state is made clear in FIG. 5 which illustrates the sector 7, shown in FIG. 4, of the sheet lamella 2f. It is evident from FIG. 5 that, by the part region 2a1 located between the clearance 6 and reception pocket 3 of this sector being bent up, a projection in the form of two radially outward-directed extensions which fix the permanent magnet 4 in the reception pocket 3 is obtained.

FIG. 6 shows a longitudinal sectional illustration of a permanent magnet rotor according to an alternative embodiment of the invention. The permanent magnet rotor according to this alternative embodiment is largely identical to the above-described permanent magnet rotor according to the third embodiment. It differs from this, however, in that the permanent magnets have bevels 4a in their end regions, and in that the projections 2/1 and 2g1 of the part region, lying between the respective clearance and respective reception pocket, of the inner region fix the permanent magnets in each case in the region of these bevels. In this alternative embodiment, the permanent magnets may be flush with the respective end lamella on the end faces of the rotor packet. There is no need on the end faces of the rotor packet for additional end lamellae which project beyond the permanent magnets in the direction of the end faces of the rotor packet.

According to the invention described above, the additional components, such as adhesive, sealing compound and/or clamps, provided for fixing the permanent magnets in known permanent magnet rotors may be dispensed with. Their function is assumed, in the present invention, by means of projections of the part regions of the inner region which lie between the clearances provided in the radially inner region of the rotor packet and the reception pockets.

During operation, because of their magnetization, the permanent magnets are basically secured automatically against slipping out of place within the respective reception pocket, since they are held in the middle of the respective reception pocket by the prevailing magnetic forces. If, however, high accelerations occur during operation, it could nevertheless happen that the permanent magnets slip out of place within the respective reception pocket and are possibly thrown out from the reception pockets. In the permanent magnet rotor according to the invention, this is prevented by the above-described projections which can absorb the forces occurring during acceleration.

The permanent magnet rotor described above is preferably a permanent magnet rotor provided for an actuating drive of a motor vehicle. The actuating drive serves, for example, as a windshield wiper motor, as a window lifter motor, as a steering motor or as a motor for electrical seat adjustment.

The invention claimed is:

1. A permanent magnet rotor, comprising:
    a rotor shaft,
    a rotor packet fastened to the rotor shaft and comprising a radially inner region and a radially outer region,
    reception pockets provided in the rotor packet between its radially inner region and its radially outer region,
    permanent magnets positioned in the reception pockets, and
    clearances provided in the radially inner region of the rotor packet,
    wherein the permanent magnets are fixed in the respectively associated reception pocket by means of a projection of a part region of the inner region, wherein the part region is arranged between the respective clearance and the respective reception pocket.

2. The rotor of claim 1, wherein the clearances are stamped-free portions of the rotor packet.

3. The rotor of claim 2, wherein first part regions of the inner region which are arranged between the clearances and the reception pockets are designed to be closed, and wherein the projections are forming closed tabs.

4. The rotor of claim 2, wherein second part regions of the inner region which are arranged between the clearances and the reception pockets comprise in each case slots, and wherein the projections are forming extensions which in each case partially closing the respective reception pocket.

5. The rotor of claim 1, wherein first part regions of the inner region which are arranged between the clearances and the reception pockets are designed to be closed, and wherein the projections are forming closed tabs.

6. The rotor of claim 1, wherein second part regions of the inner region which are arranged between the clearances and the reception pockets comprise in each case slots, and wherein the projections are forming extensions which in each case partially closing the respective reception pocket.

7. The rotor of claim 1, wherein the projections are positioned in each case in the vicinity of the middle region of a permanent magnet.

8. The rotor of claim 1, wherein the rotor packet consists of a multiplicity of sheet lamellae, and the sheet lamella located nearest to one end face of the rotor packet is provided with the clearance.

9. The rotor of claim 8, wherein the sheet lamella located nearest to the other end face of the sheet packet comprises a clearance.

10. The rotor of claim 8, wherein all sheet lamellae of the rotor packet comprise a clearance.

11. The rotor of claim 10, wherein the sheet lamellae positioned in the axially middle region of the rotor packet comprise projections in order to fix the permanent magnets non-positively in the reception pockets.

12. The rotor of claim 1, wherein the permanent magnets comprise in each case bevels in at least one of their end regions, and wherein the projections fix the permanent magnets in the region of the bevels.

13. The rotor of claim 12, wherein the sheet lamellae positioned in the axially middle region of the rotor packet comprise projections in order to fix the permanent magnets non-positively in the reception pockets.

* * * * *